Feb. 7, 1961 C. PRINDLE 2,971,150
APPARATUS FOR NON-DESTRUCTIVE TESTING OF METALS
Filed Jan. 31, 1958
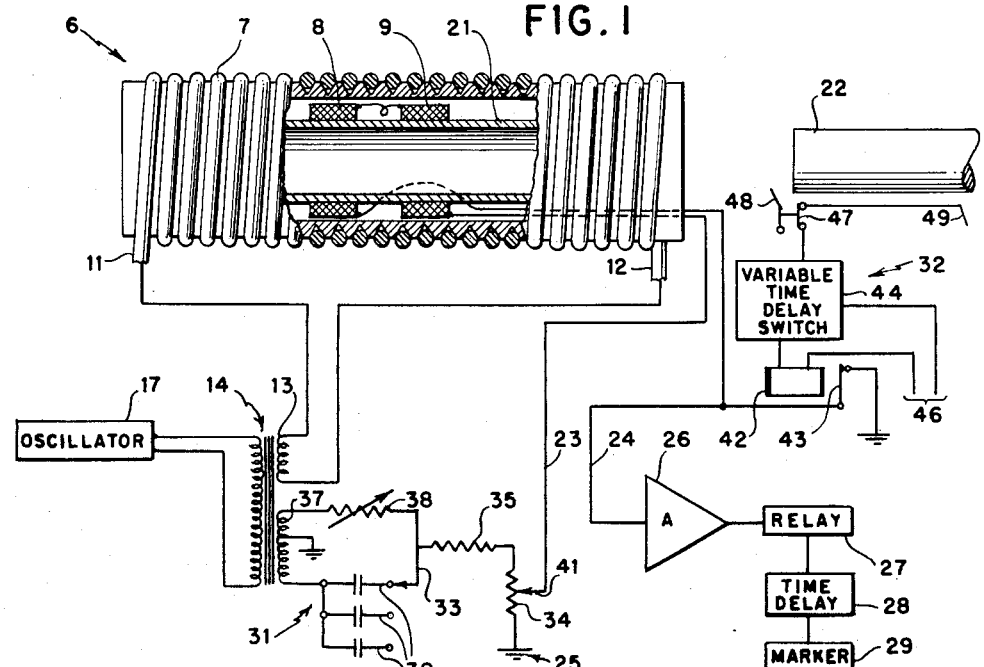
FIG. 1
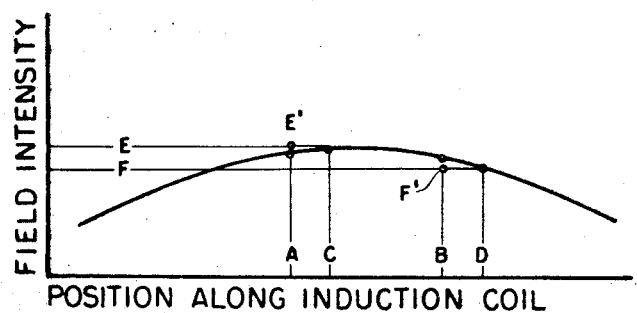
FIG. 2
FIG. 3
INVENTOR.
Charles Prindle
BY
ATTORNEY

United States Patent Office

2,971,150
Patented Feb. 7, 1961

2,971,150

APPARATUS FOR NON-DESTRUCTIVE TESTING OF METALS

Charles Prindle, Mount Kisco, N.Y., assignor to Robinson Technical Products, Incorporated, Teterboro, N.J., a corporation of New York Filed Jan. 31, 1958, Ser. No. 712,444

10 Claims. (Cl. 324—40)

This invention relates to the art of non-destructive testing of metals. More particularly, it relates to test devices used in this art and employing an induction coil to induce electromagnetic effects in the article being tested, and at least one detector coil to sense electromagnetic variations adjacent the article due to defects within the article. A test device of this type is disclosed in Davis Patent 2,065,118.

The use of such test devices for testing copper tubing occasioned the present invention and the invention will be described with reference to this service.

The copper tubing industry has been prompted to employ the test devices by a demand for copper tubing free of small defects so as to be suitable for use in making finned tubes by hydraulically expanding tubing so that it tightly engages fins positioned at spaced intervals along the tubing. While test devices heretofore used for this purpose have enjoyed considerable commercial acceptance, they have the disadvantage that testing is not satisfactory at high rates of tube throughput. I have discovered, surprisingly, that the devices can be operated at substantially higher tube throughput rates if the induction coil is constructed in a particular manner.

According to the invention, the induction coil includes a layer of turns characterized in that the turns thereof are uniformly and closely spaced. Advantageously, the desired spacing of the closely spaced turns is obtained by laying the turns along a screw thread of uniform pitch cut in a hollow cylindrical coil form employed to support the turns, and the length to diameter ratio of the coil is at least about 4 to 1.

While the reason for the improved results incidental to the use of the coil of the invention is not surely understood, it is believed that in part at least the improved result is a consequence of the coil of the invention providing a more uniform field than is provided by coils heretofore used. This theory is discussed in more detail hereinafter.

The invention will now be described with reference to the accompanying drawing in which an embodiment thereof is depicted.

In the drawing:

Fig. 1 is a schematic diagram of a test device of the type to which the invention particularly relates and having an induction coil according to the invention;

Fig. 2 is a view of an induction coil according to the invention, a part of the coil being in section and some of the turns being removed so as to clearly show the construction of the coil form; and Fig. 3 is a graph submitted as depicting a possible comparison of the operation of the induction coil of the invention and induction coils heretofore commonly used.

Referring to Fig. 1 of the drawing, the test device there shown comprises a coil assembly 6 including a cylindrical induction coil 7 and two detector coils 8 and 9. The induction coil is formed of a single layer of uniformly closely spaced turns, as is more particularly described hereinafter with references to Fig. 2, and is connected by leads 11 and 12 to a source of alternating E.M.F. in the form of the output coil 13 of transformer 14 having input coil 16 connected to oscillator 17 which is adapted to supply alternating E.M.F. at selectable frequencies within the range of about 500 to 16,000 cycles. Detector coils 8 and 9 are lattice wound on hollow cylindrical detector coil support 21 so that the detector coils are concentrically disposed within the induction coil 7 and are adapted to have copper tubing 22, which is to be tested, passed axially therethrough. The detector coils are oppositely wound and series connected so that E.M.F.'s induced in the detector coils oppose each other.

In the operation of the device, the induction coil is energized with the result that electromagnetic effects, e.g. eddy currents, are induced in tubing passed axially through the coil assembly. Changes in the electromagnetic effects are incidental to the existence of defects in the tubing and these changes cause changes in the E.M.F. of the detector coils. The detector coils are connected by leads 23 and 24 with ground at 25 and amplifier 26, respectively. The amplifier is responsive to changes in the E.M.F. of the detector coils, and hence to the passage of defects by the detector coils, and controls a relay 27 which actuates a time delay 28 connected to control the operation of a marker 29 which marks the tubing as it leaves the coil assembly to indicate the location of defects.

Auxiliary devices provided to improve operation of the test device include null balancing circuit 31 and test device on-off switch 32. The null balancing circuit is employed to zero the E.M.F. output of the detector coils in the absence of any defect in the article being tested and includes phase shifting circuit 33, potentiometer 34, and fixed resistor 35. The phase shifting circuit is of the type commonly used to control the operation of grid-controlled gaseous discharge tubes and includes center tapped coil 37 connected as an output coil of transformer 14, variable resistor 38 and a bank of condensers 39 provided to permit maintaining an impedance ratio of 10 to 1 for the shifting circuit. Potentiometer 34 has its movable contact 41 connected to lead 23 of detector coils 8 and 9 so that the amplitude of the output of the balancing circuit to the detector coil circuit can be controlled. The fixed resistor 35 precludes the functioning of the detector coil from upsetting the operation of the phase shifting circuit.

The test device on-off switch 32 is constructed to isolate the amplifier 26 from the detector coil circuit, by grounding the detector coil circuit, when tubing being tested is not properly positioned within the detector coils. The on-off switch 32 includes a relay 42 arranged to control the position of armature 43 which is connected so as to ground the detector circuit lead 24 to amplifier 26 when the relay is not energized, a variable time delay switch 44 in one of the leads to the relay 42 from power source 46, and a two point make trip switch 47 arranged so that its trip arm 48 is disposed in the path of tube 22 so that trip switch 47 is operated when the tube engages or disengages the trip arm 48. The trip switch 47 is connected in power line 49 and controls the operation of the time delay switch 44. the time delay switch is advantageously made variable so that the interval between contact of the tube 22 with the trip arm 48 and operation of the test device can be varied.

The construction of the induction coil 7 is depicted in Fig. 2. According to the invention, the induction coil has at least one layer of turns characterized in that the turns thereof are uniformly and closely spaced, and, preferably, the coil has only one layer of turns. In Fig. 2 the coil 7 has a single layer of uniformly closely spaced turns 51 which are laid along screw thread 52 formed in the outer surface of hollow cylindrical coil form 53. The coil form can be wood and the screw thread, which is of uniform pitch, can be made with a lathe. A suitable accuracy of thread pitch is 1 part in 10,000, and fortuitously a screw thread of this accuracy can be made in a coil form with commonly available lathes. The coil turns must be spaced sufficiently close together that good mutual flux linkage is obtained. The minimum spacing of the turns is not critical as it is only necessary that adjacent turns do not contact each other. Advantageously, the space between turns does not exceed about 0.005 inch and, preferable is less than about 0.002 inch. The ratio of length to diameter (measured from center line to center line of the conductor formed into the turns) is preferably at least about 4 to 1, and is advantageously in the range of 3-5 to 1. An example of a coil of the invention is a coil having a diameter of ⅞", a length of 4½", and 40 turns per inch formed of No. 24 copper wire.

In Fig. 3 there is shown a graph depicting a possible explanation for the improved results realized with the induction coil of the invention. In the graph, position along the induction coil is plotted along the $x$-axis and field intensity is plotted along the $y$-axis. The curve 54 is for a prior art induction coil and shows field intensity along a portion of the length of the coil. For a coil producing the non-uniform field intensity indicated by curve 54, if the detector coils are positioned at A and B and assuming that the tube is moving from right to left, at positions C and D the tube will be subjected to intensities E and F respectively. The effects on the tube of these intensities are dissipated over an interval of time so that at a high rate of tube throughput, the effect of intensities E and F will exist at the detector coil positions A and B respectively, and hence, considered in terms of effects produced in the tubing being tested the field intensity at the detector coil positions A and B will be E' and F' respectively, which intensities are unequal so that the test device will indicate a defect though in fact no defect is present. With the induction coil of the invention, the field intensity is uniform along the portion of the induction coil where the detector coils are located and hence this phenomenon does not occur.

Non-uniformity in field intensity can be caused by an improper length to diameter ratio, or, what is more likely, by irregularity in the pitch of coil turns. In the coil of the invention, allowance is made for these considerations and over a portion of the coil, a uniform intensity is obtained. Thus, for a 4½" long by ⅞" diameter coil constructed according to the invention, the intensity, as determined by measurements taken in millivolts at ¼" intervals, is constant at 459 for a length along the coil of 1 to 1½ inches. In general, for an induction coil of the invention having a length to diameter ratio of at least about 4 to 1, the field will be uniform along a portion of the coil equal in length to about $L-3D$, where L is the length of the coil and D is the diameter. This portion of the coil will be centrally disposed along the coil (i.e., it will extend toward each end of the coil an equal distance from the center point of the coil axis), and the detector coils are positioned along this portion. Induction coils having length to diameter ratios of less than 4 to 1 can be used provided the detector coils are disposed along the portion of uniform intensity. A detector coil spacing of ¾ inch is convenient and, for this spacing, induction coil dimensions can be from 4½" long by ⅞" in diameter to 7" long by 2⅛" in diameter.

It should be noted that non-uniformity in field intensity cannot be satisfactorily compensated for by null balancing since this adjustment merely eliminates the static effect of non-uniformity. Thus, regardless of the use of null balancing, false indications will result at a high tube throughput rate.

I claim:

1. In a test device for finding defects in metal articles comprising a cylindrical induction coil, means for connecting said induction coil to a source of alternating E.M.F., a detector coil disposed concentrically within the induction coil and adapted to have the articles to be tested passed axially therethrough, whereby with the induction coil energized electromagnetic effects are induced in the articles passed through the detector coil and changes in the electromagnetic effects due to defects in the articles cause changes in the detector coil E.M.F., means connected to the detector coil responsive to changes in detector coil E.M.F., the improvement which comprises the induction coil having a layer of turns characterized in that the turns thereof are out of contact with each other and are uniformly and closely spaced.

2. The improvement according to claim 1, the induction coil having only one layer of turns.

3. In a test device for finding defects in metal articles comprising a cylindrical induction coil, means for connecting said induction coil to a source of alternating E.M.F., a detector coil disposed concentrically within the induction coil and adapted to have the articles to be tested passed axially therethrough, whereby with the induction coil energized eddy currents are induced in the articles passed through the detector coil and changes in the eddy currents due to defects in the articles cause changes in the detector coil E.M.F., means connected to the detector coil responsive to changes in detector coil E.M.F., the improvement which comprises the induction coil being characterized in that the turns thereof are out of contact with each other and are uniformly and closely spaced, the spacing of the coil turns being less than about 0.005 inch.

4. The improvement according to claim 3, the induction coil having only one layer of turns.

5. The improvement according to claim 4, the length to diameter ratio of the induction coil being at least about 4 to 1.

6. The improvement according to claim 4, the induction coil comprising a hollow cylindrical coil form having a screw thread of uniform pitch in the outer surface thereof, the turns of the coil being laid along said thread.

7. In a test device for finding defects in metal articles comprising a cylindrical induction coil, means for connecting said induction coil to a source of alternating E.M.F., two detector coils, said coils being oppositely wound and series connected, each detector coil being concentrically disposed within said induction coil and adapted to have the articles to be tested passed axially therethrough, whereby with the induction coil energized eddy currents are induced in the articles passed through the detector coils and changes in the eddy currents due to defects in the articles cause changes in the E.M.F. of the detector coils, means connected to the detector coils responsive to changes in the E.M.F. of the detector coils, the improvement which comprises the induction coil being characterized in that the turns thereof are out of contact with each other and are uniformly and closely spaced, the spacing of the coil turns being less than about 0.005 inch, the detector coils being positioned along a portion of the coil equal in length to about $L-3D$, where L is the length of the coil and D is the diameter thereof, and extending toward each end of the coil an equal distance from the center point of the coil axis.

8. The improvement according to claim 7, the induction coil having only one layer of turns.

9. The improvement according to claim 8, the length to diameter ratio of the induction coil being at least about 4 to 1.

10. The improvement according to claim 8, the induction coil comprising a hollow cylindrical coil form having a screw thread of uniform pitch in the outer surface thereof, the turns of the coil being laid along said thread.

References Cited in the file of this patent

UNITED STATES PATENTS

| | | |
|---|---|---|
| 1,625,212 | Karas | Apr. 19, 1927 |
| 1,800,676 | Burrows et al. | Apr. 14, 1931 |
| 1,829,175 | Willans et al. | Oct. 27, 1931 |
| 1,952,185 | Smith | Mar. 27, 1934 |
| 2,065,118 | Davis | Dec. 22, 1936 |
| 2,215,605 | De Lanty | Sept. 24, 1940 |
| 2,790,950 | Miller | Apr. 30, 1957 |
| 2,817,060 | Stateman et al. | Dec. 17, 1957 |